Patented Dec. 31, 1929

1,741,496

UNITED STATES PATENT OFFICE

FREDERICK W. BINNS, OF QUINCY, MASSACHUSETTS, ASSIGNOR TO VIRGINIA SMELTING COMPANY, OF PORTLAND, MAINE, A CORPORATION OF MAINE

PROCESS FOR STRIPPING RAGS WITH SULPHUR DIOXIDE

No Drawing.  Application filed August 6, 1927.  Serial No. 211,265.

This invention provides a method of treating and stripping rags, cloths, yarns, or wastes of wool, cotton, rayon, silk or other textiles, cellulose, and like materials, for the purpose of removing the coloring matter therefrom, if present, and/or bringing them into a condition suitable for subsequent dyeing or re-dyeing.

The discovery of the invention includes the observation that a solution resulting from the addition to water of zinc (or other reducing metal) and sulphur dioxide, is a most efficient reagent for stripping colored cloths and like materials and that it not only rapidly and effectively removes most of the dyestuffs ordinarily used (with a few exceptions) but that it furthermore leaves the fiber surfaces in a condition especially favorable for subsequent dyeing operations. It has further been discovered, as a part of this invention, that the addition of an extremely small amount of formaldehyde to such a solution assists the stripping.

It may not be necessary, but is usually desirable to first wash the material to be treated, with an alkaline solution such as aqua ammonia, or at least to finish with an alkaline solution, and then to rinse with water, substantially to remove any large excess of the washing liquor.

A typical instance of practice of the invention will accordingly be described, including a suitable preliminary washing treatment and a representative procedure for effecting the stripping of the coloring matter as well as providing a surface condition of the fiber especially suitable for re-dyeing or the like.

For example, a quantity of the goods to be stripped may first be covered with a suitable amount of water to which about 5% by weight (of the goods) of commercial ammonia solution (26° Baumé) is added. The charge is then boiled for about fifteen minutes in either an open or closed tank. If an open tank is used, the goods may be poled to advantage; if a dyeing machine or percolator is employed the poling may be omitted. The solution is then drawn off and the goods allowed to drain, or otherwise separated from the wash water. The treatment is preferably repeated, using about 3% of aqua ammonia, and the solution again removed. The charge of goods is rinsed several times with water, preferably until they are substantially neutral, though a slight alkalinity may prevail without detriment.

The stripping solution may meanwhile be prepared by adding, for example, 28 pounds of zinc dust to 42 gallons of water and stirring vigorously (in a vessel containing a cooling coil) to produce a fairly uniform suspension of the powdered metal. A stream of sulphur dioxide (preferably liquid) may then be introduced into the bottom of the suspension mixture, to the ultimate amount of forty pounds.

This operation may be conveniently carried out in apparatus such as that shown and claimed by United States Patent 1,472,828, granted to Mr. Frederic A. Eustis, November 6, 1923, in which liquid sulphur dioxide may be introduced into the bottom of a mixer containing the water suspension of zinc dust and simultaneously agitated therewith, but preferably without frothing or foaming. The solution as thus prepared is especially efficient for removing the coloring matter from either wool, cotton, rayon or silk, whether rags or cloth or goods containing mixtures of these fibers. However, it is desirable that it be used shortly after it has been freshly prepared,—for example within about twenty-four hours.

I have now further found that if, in accordance with this invention, the solution (freshly prepared as above) be treated with a relatively small proportion of formaldehyde of the order of 10% or less upon the weight of the sulphur dioxide,—e. g., 1½ pounds of formaldehyde, with vigorous stirring for five minutes, the resulting solution is thereby made more effective.

Whether the solution is one which has been freshly prepared as above, without formaldehyde, or one to which a small amount of formaldehyde has been added, the material to be treated may be covered with water and the treating solution added. Nine gallons, for example, are found to be sufficient to strip the color from 450 pounds of ordinary sweater waste. The mixture is then heated to boiling and boiled for such time as may be necessary, e. g. 30 minutes. The goods may also be poled to advantage, if an open kettle is used. The treating solution may then be drawn off and the goods washed thoroughly. They are then in a suitable condition for dyeing or re-dyeing, as may be desired.

I claim:

1. Process of treating colored rags and like materials, which comprises the step of subjecting the same to a freshly made solution resulting from the addition of zinc dust and sulphur dioxide to water, and formaldehyde in an amount less than 10%, by weight, of the sulphur dioxide component.

2. Process of treating colored rags and like materials, which comprises the step of subjecting the same to a freshly made solution resulting from the addition of one part of zinc dust and about one and one-half parts of sulphur dioxide to water, and formaldehyde in an amount less than ten per cent, by weight, of the sulphur dioxide component.

3. Process of treating colored rags and like materials, which comprises the step of subjecting the same to a solution resulting from the addition of a reducing metal and sulphur dioxide to water, and formaldehyde in an amount less than ten per cent, by weight, of the sulphur dioxide component.

4. Process of treating colored rags and like materials, which comprises the step of subjecting the same to a solution resulting from the addition of a reducing metal and sulphur dioxide to water, the metal being in excess of its chemical equivalent of the sulphur dioxide, and a small amount of formaldehyde.

5. Process of treating colored rags and like materials, which comprises placing the same in a solution resulting from the addition of zinc dust and sulphur dioxide to water, the zinc dust being in excess of its chemical equivalent of the sulphur dioxide, and about four per cent by weight of formaldehyde with respect to the weight of the sulphur dioxide and heating.

6. Process of treating colored rags and like materials, which comprises subjecting the same to a solution resulting from the addition of zinc dust and sulphur dioxide to water, the zinc dust being in excess of its chemical equivalent of the sulphur dioxide, and a small amount of formaldehyde, said treatment being conducted at elevated temperatures.

7. Process of treating colored rags and like materials, which comprises subjecting the same to a freshly made solution resulting from the addition of zinc dust and sulphur dioxide to water.

8. Composition for treating colored rags and like materials, comprising the reaction products of metallic zinc, sulphur dioxide and water, and formaldehyde in an amount less than 10% by weight of the sulphur dioxide.

9. Composition for treating colored rags and like materials, comprising the reaction products of approximately 28 parts by weight of metallic zinc, 40 parts sulphur dioxide, and water, and 1½ parts formaldehyde.

Signed by me at Boston, Massachusetts, this first day of August, 1927.

FREDERICK W. BINNS.